United States Patent [19]

Kirschner

[11] 4,426,349

[45] Jan. 17, 1984

[54] PROCESS FOR IMPROVING DIMENSIONAL STABILITY OF VIDEO DISC CADDY

[75] Inventor: Thomas F. Kirschner, Indianapolis, Ind.

[73] Assignee: RCA Corporation, New York, N.Y.

[21] Appl. No.: 366,645

[22] Filed: Apr. 8, 1982

[51] Int. Cl.³ .............................................. B29C 25/00
[52] U.S. Cl. ...................................... 264/346; 264/235
[58] Field of Search ................... 264/346, 235, 342 R; 264/345, 36, 234, 231, 230, 2.7

[56] References Cited

U.S. PATENT DOCUMENTS

| | | | |
|---|---|---|---|
| 2,896,264 | 7/1959 | Natta | 264/346 |
| 3,052,924 | 9/1962 | Ezrin et al. | 264/346 |
| 3,971,173 | 7/1976 | Friendship | 264/346 |
| 3,985,852 | 10/1976 | Evans | 264/342 R |
| 4,239,108 | 12/1980 | Coleman et al. | 206/312 |

*Primary Examiner*—Donald E. Czaja
*Assistant Examiner*—Mary A. Becker
*Attorney, Agent, or Firm*—Birgit E. Morris

[57] ABSTRACT

Video disc caddies are treated to maintain dimensional stability by heating them while preventing either inward or outward bowing of the caddy halves for a time sufficient to stress-relieve the plastic.

5 Claims, 4 Drawing Figures

PROCESS FOR IMPROVING DIMENSIONAL STABILITY OF VIDEO DISC CADDY

This invention relates to plastic molded parts having improved dimensional stability. More particularly, this invention relates to a process for improving the dimensional stability of molded plastic packages for video discs by relieving molding and assembly stresses.

BACKGROUND OF THE INVENTION

Video discs are encased in a permanent packaging comprising a molded spine which supports a 12 inch diameter (30.5 cm) video disc inside an outer plastic package or caddy. The caddy comprises two molded halves which are bonded together on three sides, leaving one side open for insertion and removal of the video disc during playback. The manufacture of the caddy requires molding of the two caddy halves, and ultrasonically welding or bonding the two caddy halves together. The video disc is placed on its spine and both are inserted into the caddy.

The dimensional tolerance of the parts are quite critical; if the caddy halves should bow inwardly, they may contact the video disc thereby damaging its surface; if the caddy halves should bow outwardly, the opening in the caddy into which the video disc must be inserted and removed will become too large (fishmouth) and difficulty may be encountered in inserting the caddy into the player thereby preventing proper operation during insertion and removal of the disc. The maximum tolerances for flatness of the caddy halves are ±0.02 inch (±0.05 cm).

The manufacturing operations introduce various stresses into the plastic material of the caddy. When the caddies are stacked for shipment or storage for lengthy periods of time, these stresses tend to be relieved, particularly when stored at elevated temperatures. This results in a loss of dimensional integrity in the parts. If the caddy halves fall in on one another during this process, the video disc may be scratched or damaged by rubbing against the caddy during removal or insertion, or even prove impossible to readily remove from the caddy.

Thus a process which will stress-relieve the caddy parts and improve their long-range dimensional tolerances and stability was sought.

SUMMARY OF THE INVENTION

I have found that caddy halves for the video disc can be stress-relieved by inserting a fixture which maintains the sides of the caddy a given distance apart and then heating the caddy at from about 150°–175° F. (65.6–79.4° C.) for a time sufficient to stress-relieve the plastic.

DETAILED DESCRIPTION OF THE INVENTION

Figure 1:
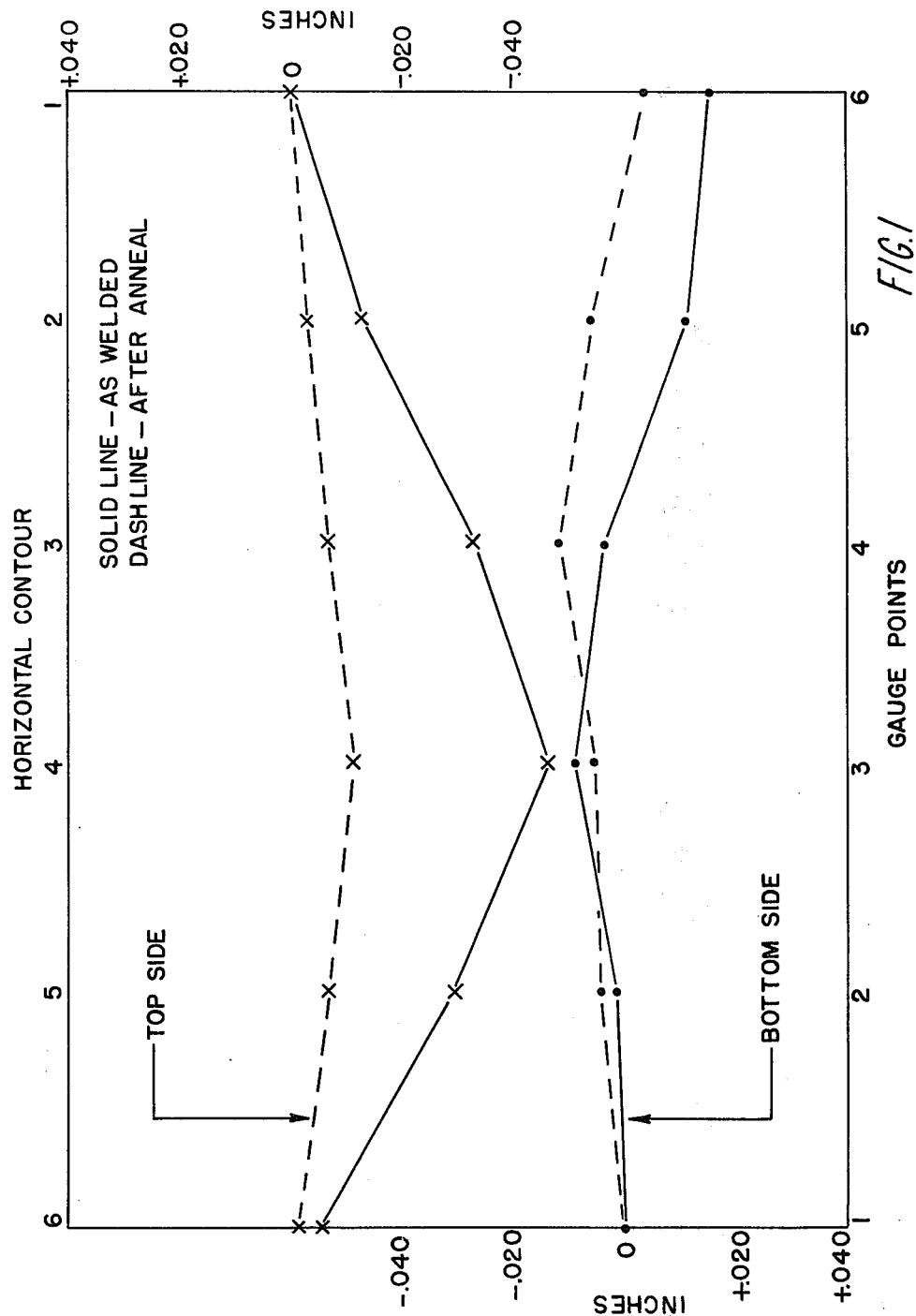
FIGS. 1–4 are graphs of horizontal and vertical measurements of disc packages before and after treatment according to the invention.

The caddy halves are molded of a medium impact polystyrene, such as the Shell Company's No. 316. The caddy is more particularly described in U.S. Pat. No. 4,239,108 to Coleman et al. The halves are then aligned and ultrasonically bonded on three sides.

To stress-relieve the completed caddy, a metal insert, of the general shape of the spine, such as of aluminum which has been cleaned to remove all particulate matter, is carefully inserted into the caddy. The metal insert is designed to have a thickness the same as the thickest part of the video disc to insure that the sides of the caddy will not bow inwardly so as to touch the video disc during storage. The internal clearance is maintained between 0.088 and 0.130 inch (0.223–0.330 cm).

The caddies are now stacked 20–40 high on a flat aluminum plate with a flat weight on the top of the stack. This weight acts to prevent the caddies from bowing outwardly during the heating step and acts as a flat base for another stack of caddies. The caddies with their inserts are placed in an oven at about 150°–175° F. for from 4–48 hours. The exact time and temperature are determined according to the number of caddies to be treated at a time. The greater the number of caddies treated in one batch, the longer it takes to come to equilibrium temperature throughout, but the higher the temperature, the shorter time it takes to reach a minimum temperature for adequate stress relief.

Following the heating cycle, the caddies are removed from the oven and allowed to cool to room temperature with the weight and inserts in place, usually about eight hours. The aluminum inserts are then carefully removed so that no debris will be formed that will remain inside. Alternatively, the interior of the caddy may be cleaned, as with an air blower or vacuum system, to remove all particulate matter.

The stresses in the caddy caused by molding, welding and stacking will all be significantly reduced by this process and treated caddies will now retain their dimensional stability for long periods of shipping and storage at lower temperatures. The final dimensions of the caddy will not change unless they are heated again to temperatures of 150° F. or higher under a different stress or configuration.

The heat treatment has several advantages in addition to insuring dimensional stability; the as-molded flatness tolerances for the caddy halves may be less critical; the assembly tolerances are less critical and the completed caddies will be more consistent in mass production.

The invention will be further described by the following Examples which are not meant to limit the invention.

In the Examples, horizontal and vertical measurements of the contour of the caddy were made and compared to the true vertical and horizontal. Along the horizontal, measurements were made along six points; #1 was taken 0.9 inch (2.3 cm) from the left hand edge; #2 was taken 2.9 inches (7.4 cm) from the edge; #3 at 4.4 inches (11.2 cm) from the edge; #4 at 8.3 inches (21.1 cm); #5 at 9.8 inches (24.9 cm) from the edge and #6 at 11.9 inches (30.2 cm) from the edge. The caddies are 12.75 inches (32.4 cm) across in this direction.

Along the vertical, measurements were made along six points; #1 at 1.7 inches (4.3 cm) from the top edge; #2 at 4.3 inches (10.9 cm) from the edge; #3 at 5.8 inches (14.7 cm) from the edge; #4 at 8.1 inches (20.6 cm) from the edge; #5 at 10.8 inches (27.4 cm) from the edge; and #6 at 13.3 inches (33.8 cm) from the edge. The caddies are 14 inches (35.6 cm) across in this direction.

EXAMPLE 1

A group of 20 caddies which were out of specification for flatness were treated as follows: a 0.1 inch (0.25 cm) thick aluminum spacer was inserted into all of the caddies which were then stacked. An 11 pound (4.98 kg) flat aluminum plate was placed on the top and bottom of the stack and the assembly placed in an oven at 170° F. (76.7° C.) for 4 hours. The assembly was then allowed to cool to room temperature for 8 hours.

The spacers were removed and vertical and horizontal measurements taken of six of the caddies. The data is given in Tables I and II which present the measurements in inches before (I) and after (II) the heat treatment respectively.

TABLE I

| Caddy | 1 | 2 | 3 | 4 | 5 | 6 |
|---|---|---|---|---|---|---|
| Horizontal Measurement - Bottom Side ||||||| 
| 1 | 0 | −.002 | −.011 | −.006 | +.009 | +.012 |
| 2 | 0 | 0 | −.008 | −.002 | +.015 | +.016 |
| 3 | 0 | −.004 | −.014 | −.006 | +.012 | +.016 |
| 4 | 0 | −.001 | −.011 | −.003 | +.014 | +.015 |
| 5 | 0 | −.003 | −.005 | −.007 | +.004 | +.011 |
| 6 | 0 | −.001 | −.006 | +.001 | +.014 | +.013 |
| Average | 0 | −.0018 | −.0092 | −.0038 | +.0113 | +.0138 |
| Horizontal Measurement - Top Side |||||||
| 1 | 0 | −.012 | −.030 | −.044 | −.027 | −.002 |
| 2 | 0 | −.013 | −.034 | −.049 | −.029 | −.005 |
| 3 | 0 | −.013 | −.033 | −.050 | −.032 | −.005 |
| 4 | 0 | −.010 | −.031 | −.045 | −.027 | −.005 |
| 5 | 0 | −.019 | −.033 | −.043 | −.031 | −.002 |
| 6 | 0 | −.012 | −.031 | −.047 | −.029 | −.004 |
| Average | 0 | −.0132 | −.0320 | −.0463 | −.0292 | −.0038 |
| Vertical Measurement - Bottom Side |||||||
| 1 | 0 | −.001 | −.003 | +.004 | +.019 | +.033 |
| 2 | 0 | 0 | −.001 | +.007 | +.019 | +.030 |
| 3 | 0 | −.002 | −.007 | −.001 | +.014 | +.028 |
| 4 | 0 | −.001 | −.002 | +.005 | +.021 | +.031 |
| 5 | 0 | −.011 | −.004 | +.024 | +.038 | +.038 |
| 6 | 0 | −.003 | 0 | +.010 | +.023 | +.030 |
| Average | 0 | −.003 | −.0028 | +.0082 | +.0223 | +.0317 |
| Vertical Measurement - Top Side |||||||
| 1 | 0 | −.012 | −.024 | −.028 | −.026 | −.024 |
| 2 | 0 | −.012 | −.026 | −.030 | −.023 | −.021 |
| 3 | 0 | −.011 | −.026 | −.032 | −.029 | −.025 |
| 4 | 0 | −.009 | −.023 | −.029 | −.026 | −.026 |
| 5 | 0 | −.018 | −.026 | −.029 | −.026 | −.024 |
| 6 | 0 | −.012 | −.025 | −.030 | −.028 | −.026 |
| Average | 0 | −.0123 | −.0250 | −.0297 | −.0263 | −.0243 |

TABLE II

| Caddy | 1 | 2 | 3 | 4 | 5 | 6 |
|---|---|---|---|---|---|---|
| Horizontal Measurement - Bottom Side |||||||
| 1 | 0 | 0 | −.001 | −.006 | −.003 | +.003 |
| 2 | 0 | −.004 | −.007 | −.009 | −.006 | +.004 |
| 3 | 0 | +.002 | +.002 | −.005 | −.004 | +.003 |
| 4 | 0 | −.007 | −.014 | −.017 | −.011 | 0 |
| 5 | 0 | −.002 | −.004 | −.007 | −.005 | +.001 |
| 6 | 0 | −.007 | −.014 | −.021 | −.013 | +.002 |
| Average | 0 | −.003 | −.0063 | −.0108 | −.007 | +.0022 |
| Horizontal Measurement - Top Side |||||||
| 1 | 0 | −.003 | −.007 | −.014 | −.009 | 0 |
| 2 | 0 | −.006 | −.013 | −.019 | −.013 | −.003 |
| 3 | 0 | −.001 | −.005 | −.010 | −.007 | −.004 |
| 4 | 0 | 0 | −.005 | −.010 | −.007 | −.001 |
| 5 | 0 | −.004 | −.004 | −.002 | −.004 | +.002 |
| 6 | 0 | +.003 | 0 | −.005 | −.004 | −.001 |
| Average | 0 | −.0018 | −.0057 | −.0100 | −.0073 | −.0012 |
| Vertical Measurement - Bottom Side |||||||
| 1 | 0 | +.004 | +.006 | +.008 | +.008 | +.011 |
| 2 | 0 | +.002 | +.001 | +.002 | +.003 | +.008 |
| 3 | 0 | +.004 | +.005 | +.010 | +.015 | +.016 |
| 4 | 0 | −.003 | −.007 | −.007 | +.001 | +.009 |
| 5 | 0 | −.001 | +.002 | +.002 | +.003 | +.010 |
| 6 | 0 | −.007 | −.011 | −.008 | −.002 | +.008 |

TABLE II-continued

| Caddy | 1 | 2 | 3 | 4 | 5 | 6 |
|---|---|---|---|---|---|---|
| Average | 0 | −.0002 | −.0007 | −.0012 | +.0047 | +.0103 |
| Vertical Measurement - Top Side |||||||
| 1 | 0 | +.001 | −.002 | −.002 | +.002 | +.001 |
| 2 | 0 | 0 | −.004 | −.007 | −.006 | −.005 |
| 3 | 0 | +.005 | +.005 | +.003 | +.003 | 0 |
| 4 | 0 | +.003 | 0 | +.001 | +.002 | +.001 |
| 5 | 0 | +.003 | +.003 | 0 | +.003 | 0 |
| 6 | 0 | +.003 | +.003 | +.001 | +.002 | −.001 |
| Average | 0 | +.0025 | +.0008 | −.0007 | +.001 | −.0007 |

Figure 2:
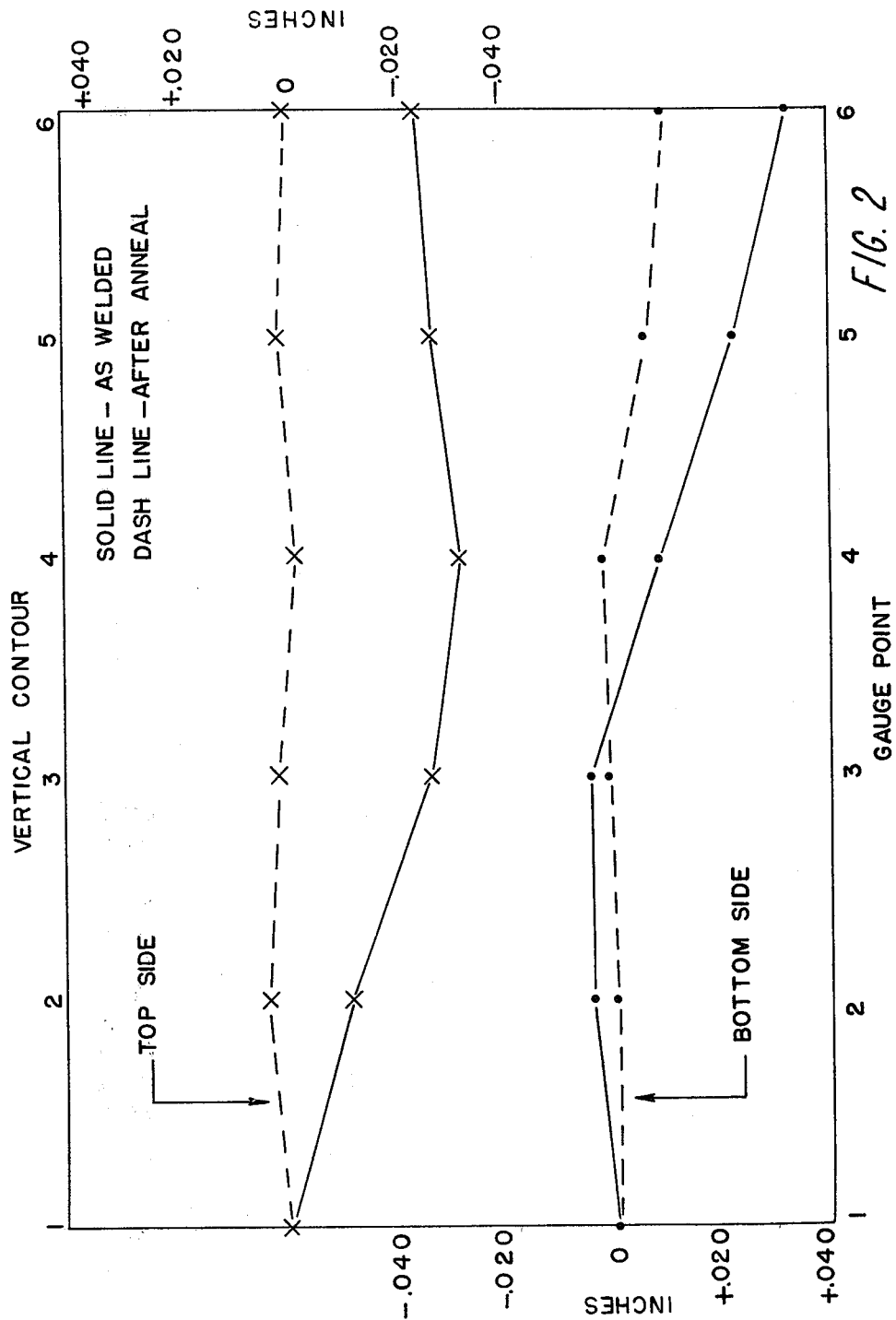

The results are also illustrated in FIGS. 1 and 2 which show the before and after annealing measurements for the horizontal and vertical measurements respectively.

EXAMPLE 2

The procedure of Example 1 was followed except the caddies were treated at 170° F. for six hours. The results of measurements of the horizontal and vertical directions for six caddies are given in Tables III and IV below which present the data before (III) and after (IV) annealing respectively.

TABLE III

| Caddy | 1 | 2 | 3 | 4 | 5 | 6 |
|---|---|---|---|---|---|---|
| Horizontal Measurement - Bottom Side |||||||
| 1 | 0 | −.009 | −.019 | −.010 | +.009 | +.015 |
| 2 | 0 | −.005 | −.015 | −.005 | +.014 | +.018 |
| 3 | 0 | −.014 | −.032 | −.029 | −.010 | +.010 |
| 4 | 0 | −.005 | −.017 | −.012 | +.005 | +.012 |
| 5 | 0 | −.014 | −.027 | −.021 | −.004 | +.013 |
| 6 | 0 | −.013 | −.026 | −.018 | −.001 | +.016 |
| Average | 0 | −.0100 | −.0227 | −.0158 | +.0022 | +.0140 |
| Horizontal Measurement - Top Side |||||||
| 1 | 0 | −.018 | −.030 | −.041 | −.030 | −.005 |
| 2 | 0 | −.010 | −.032 | −.049 | −.033 | −.007 |
| 3 | 0 | −.010 | −.026 | −.043 | −.030 | −.005 |
| 4 | 0 | −.010 | −.031 | −.048 | −.032 | −.006 |
| 5 | 0 | −.021 | −.042 | −.055 | −.039 | −.005 |
| 6 | 0 | −.020 | −.041 | −.057 | −.040 | −.005 |
| Average | 0 | −.0148 | −.0337 | −.0488 | −.0340 | −.0055 |
| Vertical Measurement - Bottom Side |||||||
| 1 | 0 | −.004 | −.013 | −.005 | +.011 | +.026 |
| 2 | 0 | −.002 | −.008 | 0 | +.017 | +.029 |
| 3 | 0 | −.016 | −.028 | −.021 | +.002 | +.028 |
| 4 | 0 | −.004 | −.010 | −.006 | +.008 | +.021 |
| 5 | 0 | −.012 | −.022 | −.015 | 0 | +.021 |
| 6 | 0 | −.012 | −.021 | −.015 | 0 | +.023 |
| Average | 0 | −.0083 | −.0170 | −.0103 | +.0063 | +.0247 |
| Vertical Measurement - Top Side |||||||
| 1 | 0 | −.018 | −.023 | −.026 | −.025 | −.025 |
| 2 | 0 | −.014 | −.025 | −.031 | −.026 | −.021 |
| 3 | 0 | −.012 | −.022 | −.028 | −.025 | −.026 |
| 4 | 0 | −.011 | −.025 | −.032 | −.028 | −.023 |
| 5 | 0 | −.019 | −.037 | −.043 | −.039 | −.032 |
| 6 | 0 | −.019 | −.036 | −.042 | −.038 | −.031 |
| Average | 0 | −.0155 | −.0280 | −.0337 | −.0302 | −.0263 |

TABLE IV

| Caddy | 1 | 2 | 3 | 4 | 5 | 6 |
|---|---|---|---|---|---|---|
| Horizontal Measurement - Bottom Side |||||||
| 1 | 0 | +.003 | +.003 | 0 | −.001 | +.003 |
| 2 | 0 | −.005 | −.008 | −.009 | −.003 | +.005 |
| 3 | 0 | 0 | 0 | −.007 | −.007 | 0 |
| 4 | 0 | −.006 | −.012 | −.019 | −.013 | 0 |
| 5 | 0 | −.008 | −.011 | −.014 | −.012 | 0 |
| 6 | 0 | −.007 | −.010 | −.015 | −.014 | −.002 |
| Average | 0 | −.0038 | −.0063 | −.0107 | −.0088 | +.0010 |
| Horizontal Measurement - Top Side |||||||

TABLE IV-continued

| Caddy | 1 | 2 | 3 | 4 | 5 | 6 |
|---|---|---|---|---|---|---|
| 1 | 0 | −.006 | −.007 | −.009 | −.009 | −.002 |
| 2 | 0 | −.002 | −.007 | −.013 | −.009 | −.004 |
| 3 | 0 | +.002 | +.003 | −.001 | −.001 | 0 |
| 4 | 0 | +.005 | 0 | −.005 | −.003 | −.003 |
| 5 | 0 | +.003 | 0 | −.005 | −.006 | −.005 |
| 6 | 0 | 0 | −.003 | −.007 | −.007 | −.002 |
| Average | 0 | +.0003 | −.0023 | −.0067 | −.0058 | −.0027 |
| Vertical Measurement - Bottom Side | | | | | | |
| 1 | 0 | +.005 | +.009 | +.012 | +.012 | +.010 |
| 2 | 0 | 0 | −.002 | 0 | +.002 | +.005 |
| 3 | 0 | +.002 | +.002 | +.002 | +.004 | +.005 |
| 4 | 0 | −.004 | −.009 | −.012 | −.010 | −.003 |
| 5 | 0 | −.003 | −.007 | −.011 | −.008 | −.001 |
| 6 | 0 | −.006 | −.009 | −.010 | −.005 | 0 |
| Average | 0 | −.001 | −.0027 | −.0032 | −.0008 | +.0027 |
| Vertical Measurement - Top Side | | | | | | |
| 1 | 0 | −.003 | −.002 | −.002 | +.002 | +.002 |
| 2 | 0 | −.001 | −.003 | −.002 | +.002 | +.002 |
| 3 | 0 | +.002 | +.004 | +.004 | +.008 | +.007 |
| 4 | 0 | +.002 | +.002 | +.004 | +.010 | +.009 |
| 5 | 0 | +.006 | +.008 | +.004 | +.008 | +.008 |
| 6 | 0 | +.002 | +.001 | 0 | 0 | 0 |
| Average | 0 | +.0013 | +.0017 | +.0013 | +.005 | +.0047 |

Figure 3:
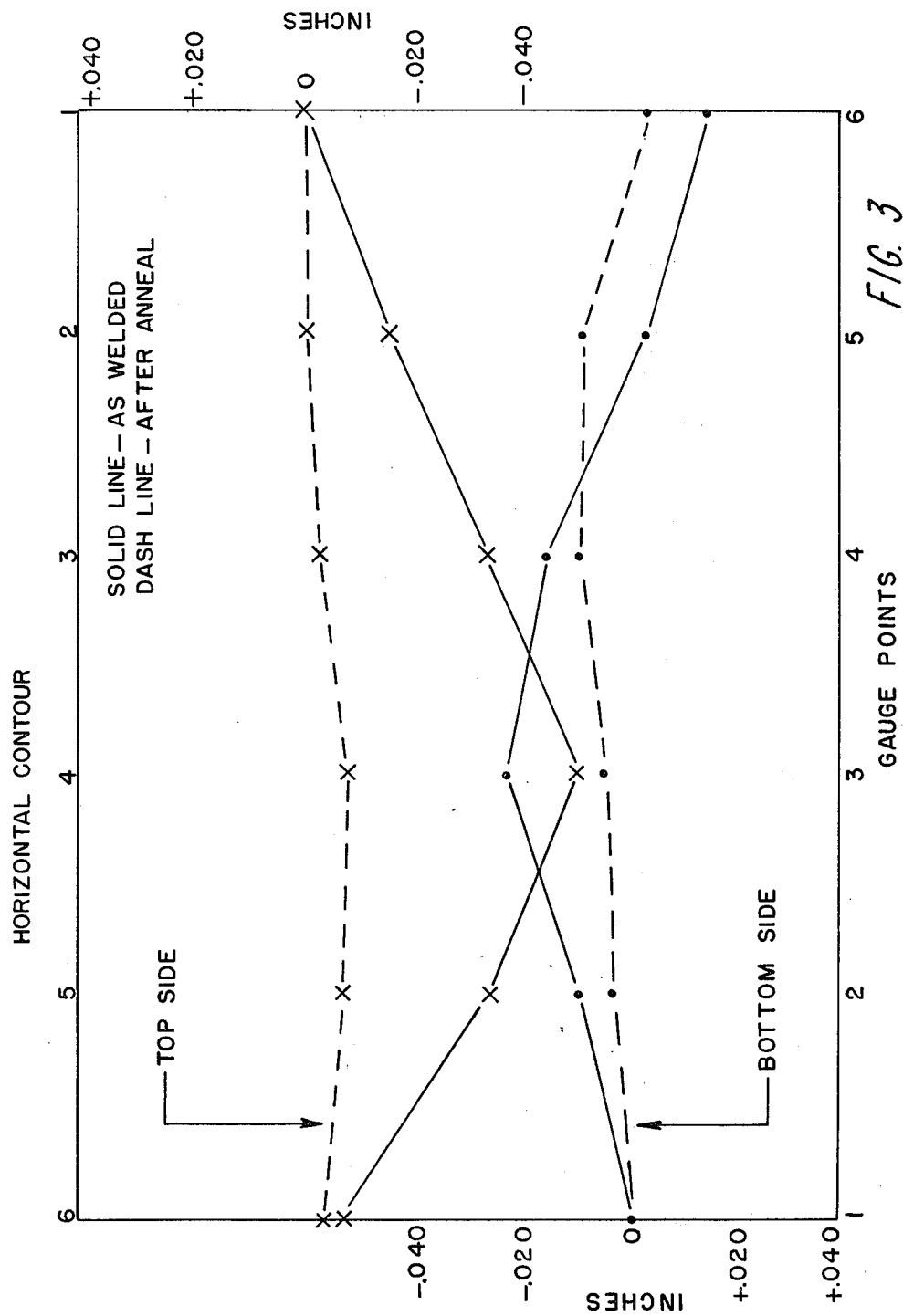
Figure 4:
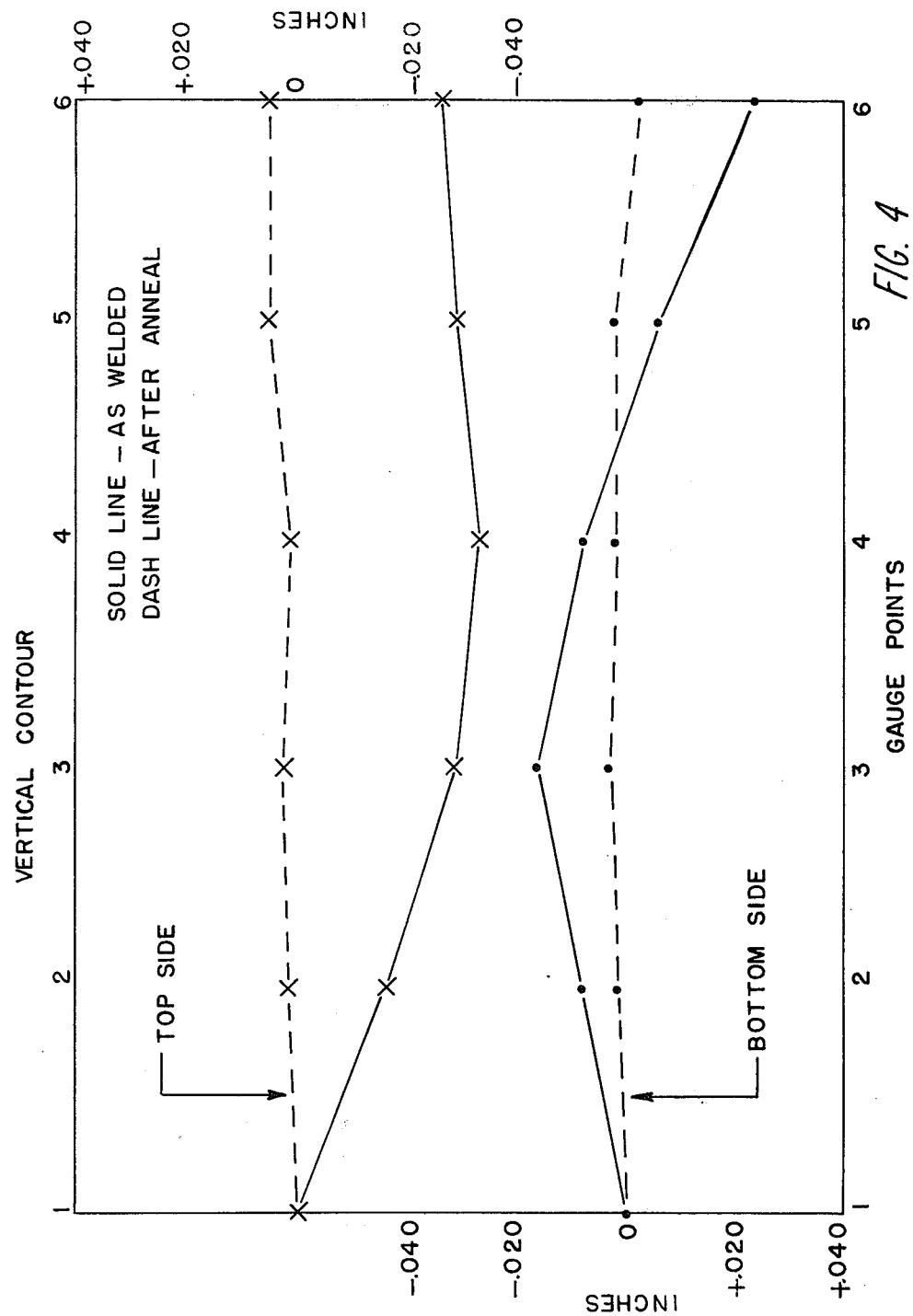

The results are also illustrated in FIGS. 3 and 4 which show the before and after annealing measurements for the horizontal and vertical measurements respectively.

EXAMPLE 3

This Example demonstrates that "twist", that is, bowing in the diagonal direction of the caddy, is also greatly reduced by the present process.

The caddy is placed on a flat fixture comprising a rectangular block. The flatness is determined by a feeler gauge 0.015 inch (0.038 cm) thick. The feeler gauge must not be able to be inserted between the caddy and the block at any point in order to pass the test.

Ten caddies were more carefully measured by comparing the distance from the block at the top, the center and the bottom end of the caddy in a diagonal direction.

Prior to annealing, the twist range was from 0.008 to 0.016 inch (0.02 to 0.04 cm), averaging 0.011 inch (0.028 cm).

The caddies were then stuffed with metal inserts, stacked and heated as in Example 2.

After heating, the twist range was from 0.003 to 0.012 inch (0.008 to 0.03 cm), averaging 0.007 inch (0.018 cm). All passed the 0.015 inch maximum twist specification.

I claim:

1. A method of improving dimensional tolerances and stability of plastic video disc caddies which comprises
    (1) inserting a flat plate in said caddy from its open side wherein said plate has a thickness at least that of the thickest part of said video disc,
    (2) weighting said caddy to prevent bowing outwardly,
    (3) heating said caddy at a temperature of from about 150°–175° F. for a time sufficient to stress-relieve the plastic of the caddy, and
    (4) cooling to room temperature without removing said weight and said flat plate.
2. A method according to claim 1 wherein said caddy is made of a medium impact polystyrene plastic.
3. A method according to claim 1 wherein said flat plate is made of aluminum.
4. A method according to claim 1 wherein said caddy is maintained under a weight of at least about eleven pounds.
5. A method according to claim 1 wherein said temperature is maintained at from 165°–175° F. for from 4–6 hours.

* * * * *